FIG.1

July 19, 1966  F. S. KORSKI ETAL  3,261,707
STATOR COATING

Filed Oct. 21, 1963  8 Sheets-Sheet 2

FIG. 2

INVENTORS
FRANK S. KORSKI
WALTER J. GRODZKI JR.

July 19, 1966 F. S. KORSKI ETAL 3,261,707
STATOR COATING

Filed Oct. 21, 1963 8 Sheets-Sheet 3

INVENTORS
FRANK S. KORSKI
WALTER J. GRODZKI JR.

INVENTORS
FRANK SKORSKI
WALTER J. GRODZKI JR.

July 19, 1966   F. S. KORSKI ETAL   3,261,707
STATOR COATING

Filed Oct. 21, 1963   8 Sheets-Sheet 5

FIG.8   FIG.9

INVENTORS.
FRANK S. KORSKI
WALTER J. GRODZKI JR.

INVENTORS.
FRANK S. KORSKI
WALTER J. GRODZKI JR.

United States Patent Office
3,261,707
Patented July 19, 1966

3,261,707
STATOR COATING
Frank S. Korski, Brentwood, and Walter J. Grodzki, Jr., Jennings, Mo., assignors to Emerson Electric Co., a corporation of Missouri
Filed Oct. 21, 1963, Ser. No. 317,757
23 Claims. (Cl. 117—18)

This application is a continuation-in-part of our application Serial No. 45,190, filed July 25, 1960.

This invention relates to the insulating of slots of electric motor stators.

Conventionally, the slots of fractional horsepower induction motor stators are insulated by inserting slot liners made of rag base paper, fiber, or other suitable insulator material. The ends of each slot insulator project from opposite ends of a slot, and are usually bent backwards 180° to form a collar at each end, to anchor the liner axially in the slot. The shearing, forming, and inserting of these slot insulators are expensive and time consuming operations. In addition, since the collars extend beyond the end faces of the stator core an appreciable amount (commonly ⅛ of an inch) it is necessary to increase the length of the end wire beyond the face of the core more than would be required if the slot insulators were not present. Also, the projection of the slot insulators leads to damage to the end coils or the collars.

Gemmer, U.S. Patent No. 2,844,489, suggests that stator slots can be coated with any of a number of resins, in accordance with the fluidized bed process described in the patent. This suggestion has been found extremely difficult to put into practice. It is one thing to apply a plastic coating to the outside of a cylindrical object, as illustrated in the patent. It is quite another, to apply a uniform, hole-free coating to the slot-defining walls of a relatively long, thin-slotted stator. Gemmer suggests immersing the entire article to be coated. However, this is impractical in the case of motor stators, since it is desirable to keep the bore-defining wall, and the radially exterior surface of the stator, free of plastic, and it is unfeasible to coat those surfaces and subsequently to remove the coating.

The usual masking expedients have proved unsatisfactory as applied to the coating of stator slots for at least two reasons. For one thing, they have not confined the deposition of the plastic to the desired areas. For another, and more importantly, they have interfered with the proper deposition of a coating on the areas which it has been desired to coat.

One of the objects of this invention is to provide means for selectively coating the slot-defining walls of a stator, easily, quickly, uniformly, and without the deposition of coating on areas in which no coating is desired.

Other objects will become apparent to those skilled in the art in the light of the following description and accompanying drawing.

In accordance with this invention, generally stated, a stator, the slots of which are to be coated, is immersed, in a fluidized bed of coating material, on a masking post which snugly but slidably fits the bore of the stator. The post is maintained at a temperature below the sintering temperature of the coating composition, and the interior of the post is open to the coating material and maintained at a pressure no greater than the pressure within the fluidized bed of coating material at each increment of depth to which the post projects.

In one embodiment of this invention the post is hollow, and ordinarily, the pressure within the post at the level of the dense body interface of the fluidized bed, will be atmospheric. If the entire system were pressurized, however, the pressure in the masking post of this embodiment might be superatmospheric, while if the entire system were evacuated to some degree, the maximum pressure in the post would be subatmospheric.

In another embodiment of this invention, the post need not be hollow, but is provided with splines which extend into gaps between the teeth which define the stator bore, and a flow of gas, usually compressed air, is utilized to serve as a kinetic mask along the side walls of the splines, to prevent the deposition of coating material on the part of the teeth defining the gap.

In the embodiments described hereafter, in addition to and in conjunction with the masking post, upper and lower, inner and outer masking rings are provided, which are also maintained at a temperature below the sintering temperature of the coating composition. The inner masking rings provide a pattern of coating deposit which helps insure that during the curing process, no coating reaches the bore-defining walls of the stator. The outer masking rings not only provide against the subsequent flow of coating composition from the axial ends of the stator to the uncoated peripheral surfaces (in the same manner as the inner masking rings), but, at least at one end, in cooperation with a masking case, bridging web and the stator itself, serve to form a chamber sealed against the ingress of coating composition from the fluidized bed during the coating process.

Certain of the relative dimensions of the elements making up the apparatus have been found to be important.

Contrary to the teachings of Gemmer, it has been found that with the arrangement of this invention, it is not essential that the stator being coated be moved to and fro during the coating process. Provision may be made for movement, in particular, vibratory movement, of the stator during the coating process, but entirely satisfactory coatings have been obtained commercially without the use of vibration or other to and fro movement, although several distinct immersions may be used to obtain the desired coating thickness.

While the vibration of the stator is not considered to be essential to the coating process, the means by which the stator is vibrated, when vibration is used, are thought to be novel.

In the drawing.

FIGURES 8–11 are schematic representations of another embodiment of apparatus of this invention, illustrating nine different steps in a method of this invention, wherein FIGURE 8 illustrates the condition of the apparatus in the first and ninth steps;

Referring now to FIGURES 1–7 of the drawing for one illustrative embodiment of this invention, the machine shown has an open, angle iron base frame 1 supported on castors 2. The base frame 1, in the illustration, is square in top plan view, with vertical corner posts 3 connected by horizontal top and bottom rails 4. A stanchion 5 extends between the top and bottom rails 4 along the back of the frame, and projects above the frame to serve as the support for a stator loading and top masking mechanism described hereafter. Cross braces 6, extending between two opposite bottom rails 4, serve to support a pair of pillow blocks 8, in which a shaft 10 is journaled.

Figure 1:
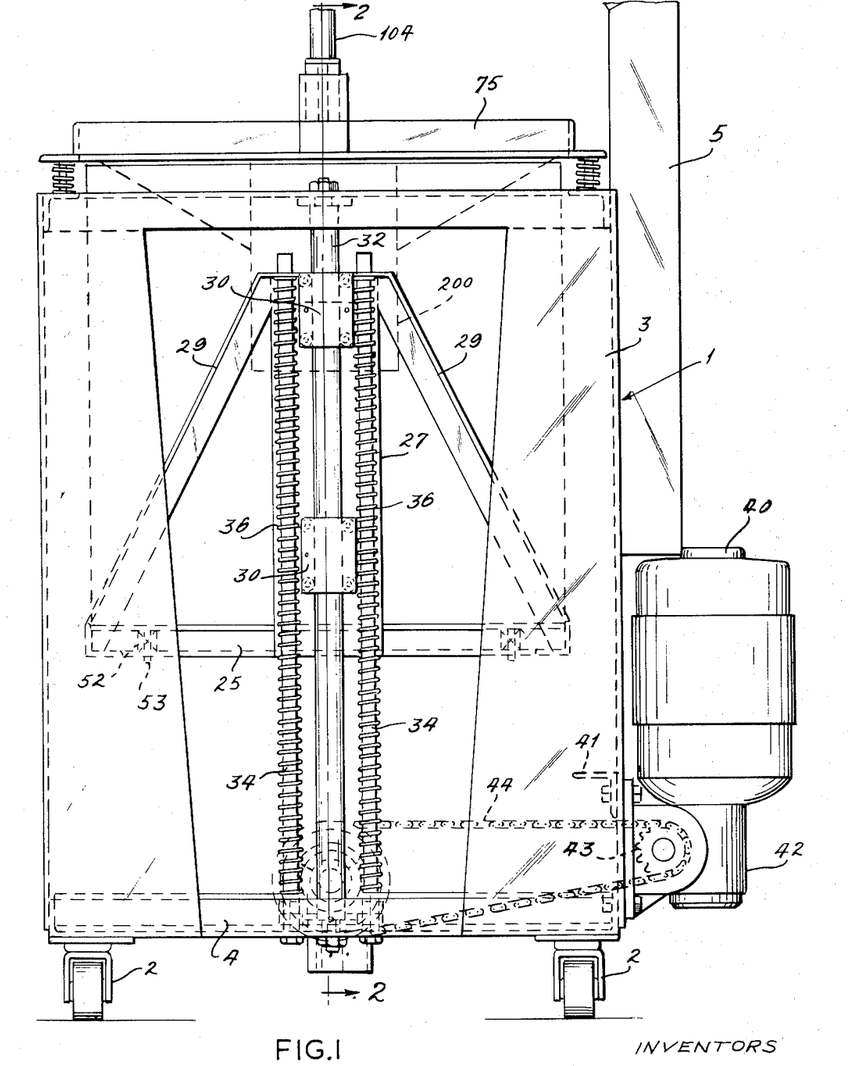
FIGURE 1 is a fragmentary view in side elevation of a coating machine constructed in accordance with one embodiment of this invention.

The pillow blocks 8 and shaft 10 are part of a tank elevating system which includes, in addition, sprocket 12, keyed to the shaft 10 intermediate the pillow blocks 8; a switch-controlling cam 14, mounted on the shaft between the sprocket 12 and one of the pillow blocks 8; crank arms 16, one mounted on each end of the shaft 10, outboard of the pillow blocks 8; and connecting rods 18, each of which is pivoted to one of the crank arms 16 at one end, and at the other, to a knuckle 20, by means of a wrist pin 21.

The knuckles 20 are secured to the underside of base members 25 of a tank-supporting platform 26. In addition to the base members 25, the tank-supporting platform 26 is provided with a pair of vertical plate members 27, welded or otherwise secured to opposite base members 25 at one end, and supported at the other end by angle iron braces 29, extending from meeting corners of the base members 25. Vertically aligned upper and lower sleeves 30 are bolted to each of the plates 27. The sleeves 30 on each side slidably embrace a post 32. The posts 32 extend between and are mounted on the upper and lower rails 4 of the base frame 1. Spring-guide spindles 34 are arranged one on either side of each of the posts 32, parallel therewith. Embracing each of the guide spindles 34 is a counterbalancing coil spring 36, with its lower end resting on the bottom frame member 4. At the upper ends of the braces 29, the flanges of the angle iron are provided with spindle receiving openings, through which the upper ends of the spindles 34 extend as shown in FIGURE 1. The upper ends of the springs 36 engage the underside of the flanges of the angle iron braces 29.

The tank supporting platform 26 is raised and lowered by means of an electric motor 40, bolted to side cross braces 41 on the back of the base frame 1. The motor 40, acting through a gear box 42, drives a pinion 43, which, in turn, drives the sprocket 12, by means of a roller chain 44. The motor 40 is controlled in part by a switch 45 mounted beneath the cam 14 in such a way that the cam engages a follower 46 on the switch 45 when the crank arms 16 approach the bottom of the base frame 1.

A tank 50, supported on springs 52, is carried by the tank supporting platform 26. The springs 52 surround stems 53, which project slidably through holes in the inwardly extending flanges of the angle iron base members 25. The tank 50, in the illustrative embodiment, is square in top plan view. It is open topped, and, in effect, double bottomed. A true bottom 54 is integral with sides 55. The stems 53 are welded or otherwise secured to the bottom 54. Vibrators 58 are shown as bolted to the bottom 54, and a compressed air fitting 59 is mounted in the bottom, opening into the interior of the tank. A flexible air hose 60 is connected at one of its ends to the fitting 59, and at its other end to a suitable source of compressed air, not here shown. Within the tank, extending around the inside margins of the bottom 54, is a wood strip 61, rabbeted to provide a stone-supported ledge 62, upon which a porous stone 65 rests. A clamping strip 66, is fastened to the wood strip 60 by means of wood screws, not here shown. The tank 50 contains finely divided plastic powder 70.

A masking case frame 75 is supported by springs 76 resting on the inturned flange of the top rails 4 of the frame 1. Rods 77, within springs 76, are secured to the underside of the frame 75 at their upper ends, and project, at their lower ends, slidably, through holes in the flanges of the upper rails 4.

The frame 75 serves to support a masking case 80, suspended centrally of the frame 75 by cantilevers 81. A cover 82, extending from the outer periphery of the frame 75 to the masking case 80, may serve as a hood.

Figure 3:
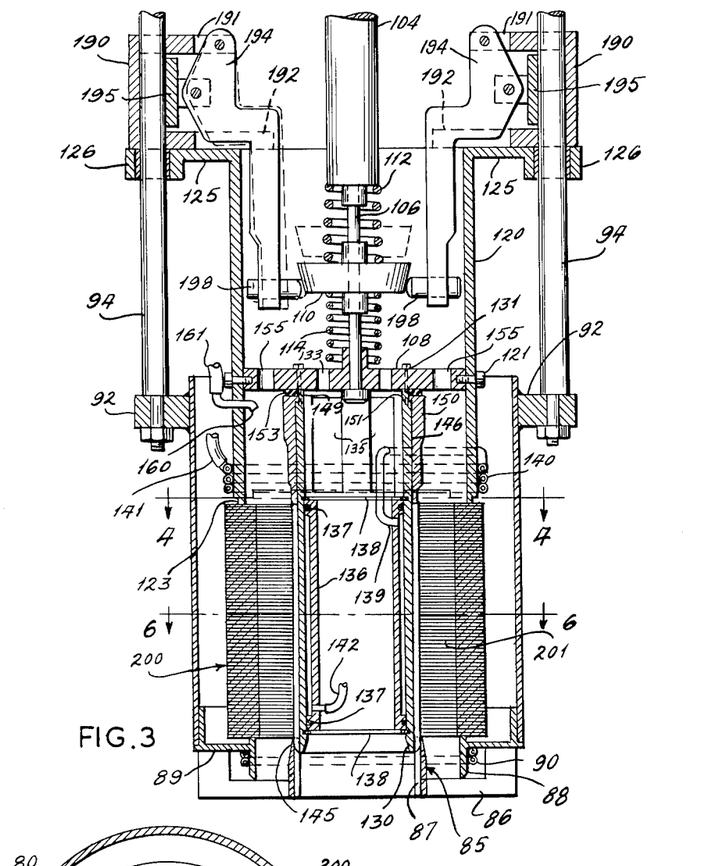
FIGURE 3 is an enlarged detail sectional view of a part of the machine shown in FIGURE 2.

The masking case 80 of this embodiment is cylindrical, completely open at its top, and provided with patterned openings in its lower end. The patterned openings are defined by an inner masking ring 85, supported in concentric axial alignment with and with its upper end slightly above the bottom of the case 80 by means of limitedly axially flexible cantilever plates 86, supported by the case 80, and an outer lower masking ring 88, spaced radially outwardly from the inner masking ring 85, and supported by an imperforate web 89, welded or otherwise secured in air-tight relationship to the inside wall of the case 80. Cooling coils 90 surround the outer masking ring 88, and are in heat-transferring contact therewith. The cooling coils are connected at one end to a source of coolant, not here shown, and at the other end to a drain, also not shown.

Figures 4, 5, 7:
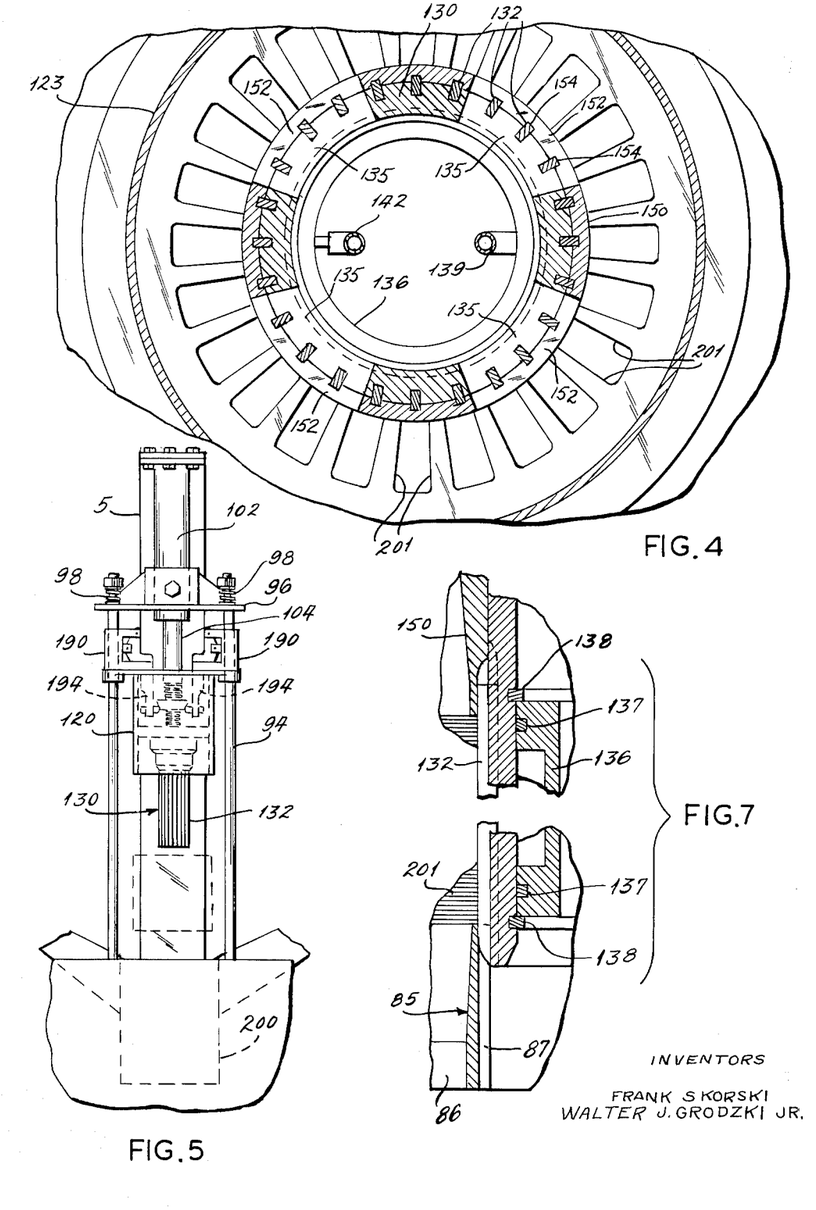
FIGURE 4 is an enlarged fragmentary sectional view taken along the line 4—4 of FIGURE 3.
FIGURE 5 is a fragmentary view in front elevation of the upper part of the machine shown in FIGURES 1–4.
FIGURE 7 is an enlarged fragmentary sectional view of a part of the center post assembly shown in FIGURES 2 and 3, with a central section broken out.

The inner masking ring 85 has axial grooves 87 in its inside surface (FIGURE 7).

Ears 92, welded to the outside wall of the case 80, on diametrically opposite sides of the case, serve to support parallel vertical runners 94, which are bolted to the ears 92.

The other ends of the runners 94 extend slidably through holes in a plate 96, and are embraced by springs 98, which are compressed between the top surface of the plate 96 and nuts threaded onto the upper ends of the runners 94.

The plate 96 is secured to the stanchion 5, as is a fluid cylinder 102. The fluid cylinder 102 is centered with respect to the runners 94 and is oriented parallel with the runners. A piston, not here shown, slides within the cylinder 102, and is connected with a piston rod 104. At the lower end of the piston rod 104, a smooth-shanked bolt 106 is screwed into an adapter plug 105 in the end of the piston rod. Slidably mounted on the smooth shank of the bolt 106 are a supporting plate 108, at the head of the bolt, a cam disk 110, intermediate the supporting plate 108 and the adapter plug 105 and two helical springs 112 and 114. The spring 112 is mounted between the end of the piston rod 104 and top of the cam disk 110, with its ends abutting the radial surfaces of the rod and disk respectively. The spring 114 is mounted between the lower side of the cam disk 110 and the upper surface of the supporting plate 108, with one end bearing on the underside of the disk cam 110, and the other end, on the supporting plate 108. The supporting plate 108 is fastened inside a cylindrical shell 120, by means of cap screws 121. The free bottom edge of the cylindrical shell 120 constitutes an upper masking ring 123. At its upper end, the shell 120 is provided with wings 125 on which are bosses 126. The bosses 126 have passages in them, through which the runners 94 extend slidably.

Depending from the underside of the support plate 108 is a masking post 130, which is axially aligned with the inner masking ring 85 of the masking case 80. The masking post 130 is secured to the underside of the plate 108 by means of cap screws 131. The masking post 130 is equipped with external, axially extending splines 132. The masking post 130 is hollow, and is provided at its upper end with venting ports 134. On the inside of the post 130 is a coolant jacket 136, sealed against leakage with O-rings 137. Still other ports 133, extending through the plate 108, communicate with the interior of the post 130.

The coolant jacket 136 is in the form of a pipe with radially outwardly extending annular flanges at both ends, the axial faces of the flanges being grooved to form seats for O-rings 137. The coolant jacket 136 is maintained in position axially of the post 130 by upper and lower retaining rings 138, seated in grooves in the inner wall of the post 130. A coolant inlet tube 139 is connected to the coolant chamber of the jacket 136, and, in the embodiment shown, forms an integral part of a cooling coil 140, surrounding the shell 120 immediately above the masking ring 123. The coil 140 is connected to a suitable source of coolant, not here shown, by means of a flexible conduit 141. The jacket 136 is connected at its lower end with a liquid discharge conduit 142. The conduit 142 leads upwardly, through a hole in the plate 108, and the open top of the shell 120, to a suitable drain, not here shown.

The splines 132 extend axially above the height of a stator to be coated, and terminate, leaving a smooth surfaced upper section 146 on the post 130. The upper end of the post 130 is rabbeted to provide an external annular shoulder 149. A masking sleeve 150, with an inturned lip 151 around its upper end, embraces the smooth upper portion 146 of the post 130. The lip 151 is normally biased into engagement with the shoulder 149 by an O-ring 153, compressed between the top of the masking sleeve 150 and the underside of the supporting plate 108. The masking sleeve 150 has ports 152 corresponding to the venting ports 135 in the post, so as to leave the latter ports unobstructed to insure that the pressure within the post is equalized with the ambient pressure. The ports 135 and 152 are rectangular in elevation, and extend longitudinally from a point just above the upper retaining ring 138, as shown in FIGURE 3, to a point just below the inturned lip 151 of the masking sleeve. The masking sleeve 150 is also provided, around its inside surface at its lower end, with spline-receiving grooves 154 in which the upper ends of splines 132 are slidably received, thus keeping the masking ring ports in registry with the post venting ports.

The annular space between the sleeve 150 and the shell 120 is vented to the atmosphere by ports 155 extending through the plate 108. A compressed air nozzle 160 extends through and is mounted in the wall of the shell 120, projecting downwardly at an angle in the chamber between the sleeve 150 and the shell 120. The nozzle 160 is connected, by a flexible conduit 161, to a suitable source of compressed air, not here shown.

In the embodiment shown, a vibrator 180, directed horizontally, is bolted to the frame 75 which supports the chamber 80. A vibrator 181 is bolted to the opposite side of the frame, and is oriented at an angle to the horizontal, in the plane of the axis of the rod 104. In order to transmit the vibratory motion of the vibrators 180 and 181 to the stator being coated, a clamping mechanism is provided. In the embodiment shown, the clamping mechanism consists of a pair of yokes 190, each slidably embracing a rod 94 and being secured to the upper side of one of the wings 125 of the shell 120. The yokes 190 have inwardly extending upper arms 191, serving as knuckles for a hinge arrangement, and lower arms 192 serving as guides. A doglegged lever 194 is pivoted at its upper end between arms 191, and extends slidably between the legs 192. A clamp shoe 195 is pivoted to the lever 194 intermediate the upper arms 191 and lower arms 192. The clamping shoe 195 is positioned to move into tight engagement with the rod 94 when the lever 194 is moved outwardly. At the lower end of the lever 194 is an adjustable bumper 198, positioned to be engaged by and cammed outwardly by the downwardly convergent peripheral surface of the cam disk 110.

The absolute dimensions set out hereinafter are illustrative, and are not intended to be limitative. In the device shown, the tank is approximately 25 inches square, and 25 inches deep, all inside dimensions. The porous stone false bottom is about an inch thick and its upper surface is about one and three fourths inches from the inside of the true bottom, leaving an air space of about three fourths of an inch.

The masking case 80, for the treatment of a stator approximately 6.5 inches in outside diameter, is, in the illustrative embodiment, about 8 inches O.D., 7½ inches I.D., and 9½ inches from its top edge to the inside surface of the web 89.

The inside diameter of the most restricted part of the post (the jacketed part) is about two inches. The open area of the venting ports 135 is at least as great as the cross-sectional area of the post.

Preferably, the ratio of the transverse cross-sectional area of the free opening in the post, at its most restricted point, to the total transverse cross-sectional area of the slots of a stator when it is mounted on the post, in the embodiment in which the post is vented freely to the atmosphere, is at least 1 to 2, and the area of the fluidized bed within a circle of which the axis of the post is the center is at least three times the transverse cross-sectional area of the masking case.

The inner masking ring 85 has an outside diameter at its upper end about a quarter of an inch greater than the bore of the stator to be treated, and an inside diameter closely but slidably to receive the post 130. The grooves 87 slidably receive the splines 132. The outer masking ring 88 has an inside diameter about three quarters of an inch greater than the circle of slot bottoms.

The dense body interface of the fluidized bed within the tank 50 is preferably maintained at a level about two inches below the bottom of the masking case 80 when the tank is in its lowermost position, and the travel of the tank is such as to bring the interface level about an inch and a half above the top of the stator to be treated, which is still almost two inches below the top of the masking case 80.

The height of the fluidized bed is determined largely by the amount of powder in the tank. For a tank of the dimensions given, about 240 pounds of powder (around 32 pounds/ft.$^3$) will be the correct amount for operation. About four to ten cubic feet of air per square foot of area in plan of the tank has been used.

In the operation of the illustrative embodiment of device shown and described, a laminated stator 200, the slot-defining walls 201 of which are to be coated, is heated above the sintering temperature of the coating powder 70, but below its decomposition temperature. In the case of the epoxy, the stator temperature is about 385° F. The piston rod 104 is raised to its uppermost position by means of the fluid (e.g. air) cylinder 102. The raising of the piston rod 104 brings with it the supporting plate 108, which, in turn, carries the shell 120, the yokes 190, and the masking post 130 to the position shown in FIGURE 5. The cooling coils 90 and 140, and the jacket 136 are supplied with coolant fluid at a temperature substantially below the sintering temperature of the plastic powder 70. The tank 50 is in its lowered position, with its upper edge at about the level of the lower edge of the chamber 80.

The vibrators 58 may be activated, though they have not been found essential under the conditions described, compressed air is supplied, through the flexible hose 60 and fittings 59, to the chamber between the bottom 54 of the tank 50 and the underside of the porous stone 65, and the powder 70 in the tank is fluidized.

Figure 6:
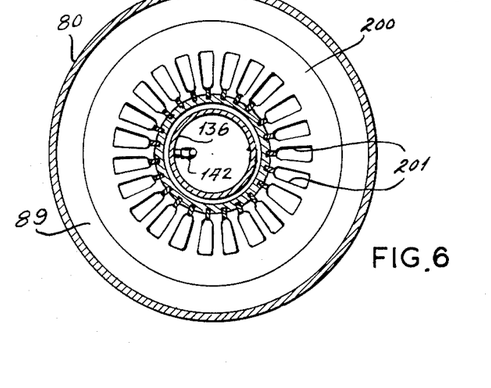
FIGURE 6 is a sectional view taken along the line 6—6 of FIGURE 3.

The hot stator 200 is then slipped onto the masking post 130, with the splines 132 extending into the narrow gaps between successive teeth of the stator, as indicated in FIGURE 6. The stator is positioned with its upper surface in engagement with the lower faces of the masking ring 123 and masking sleeve 150. The stator 200 can be held in place on the post 130 by friction, since the fit of the post 130 and splines 132 in the bore and gaps of the stator is closed, or it can be held positively by any suitable clamping means engaging the outside surface of the stator or even the lower surface of the stator radially outboard of the masking ring 88.

Compressed air is now admitted to the upper end of cylinder 102, forcing the piston rod 104, hence the post 130, downwardly. The lower end of the post slides into the masking ring 85, as shown in FIGURES 2, 3 and 7, and the lower radial face of the stator comes to rest on the upper, masking, edges of the outer and inner masking rings 88 and 85.

Figure 2:
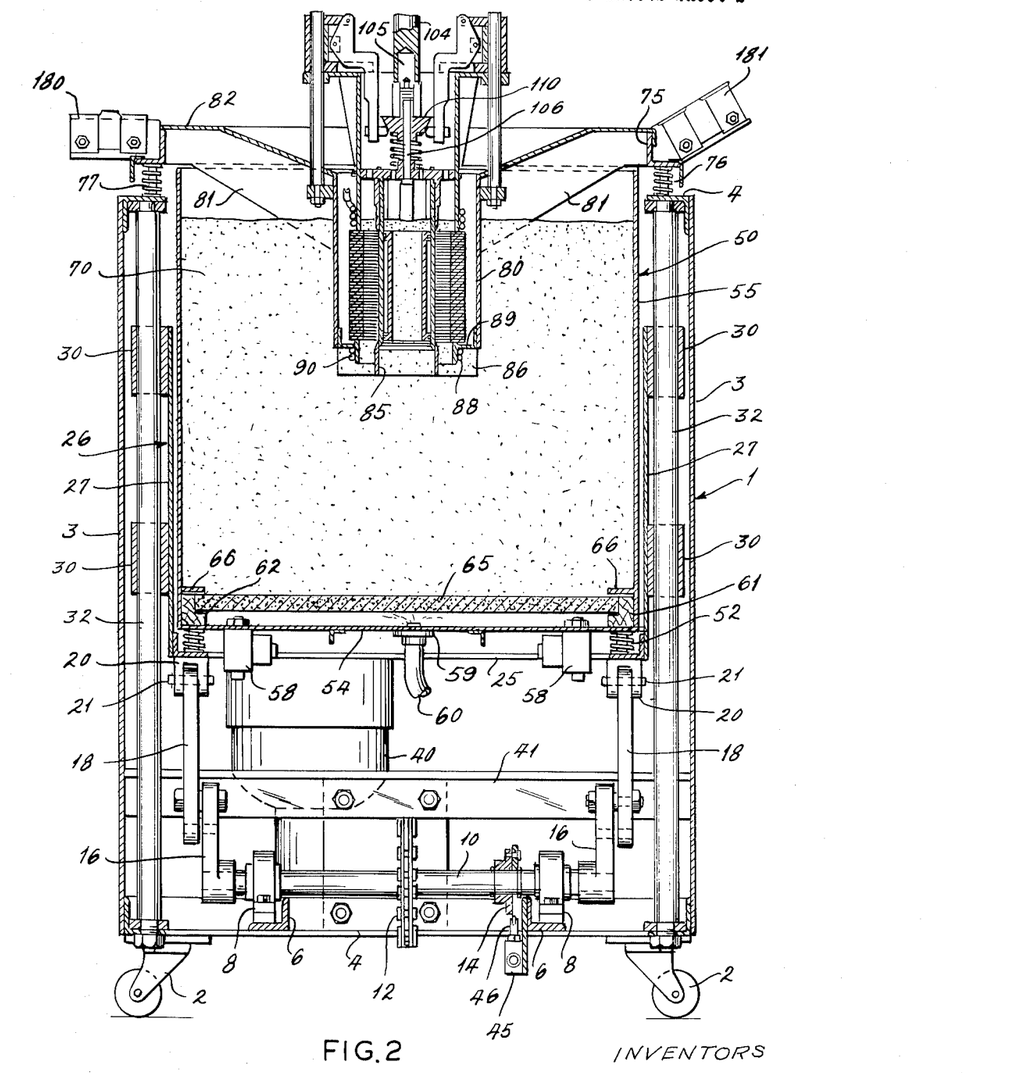
FIGURE 2 is a sectional view taken along the line 2—2 of FIGURE 1.

The circuit of the motor 40 is now energized, rotating the shaft 10 and crank arms 16, and raising the tank 50 to its uppermost position as shown in FIGURE 2. The shaft and crank arms rotate through 360° and, in this illustrative embodiment, make two revolutions per cycle, the speed of rotation being such as to give a dwell time at operative height of about one second on each revolution of the crank arms. In passing, the cam plate 14 depresses the follower 46 of switch 45, which, on the second revolution, effectively breaks the motor circuit, stopping the crank arms at bottom center, at which the tank is in its lowermost position.

When the tank has been lowered the second time, a blast of compressed air is released through the nozzle 160, to blow off any loose powder which may be present and clear the chamber above the stator of dust.

Compressed air is admitted to the lower end of the cylinder 102, the post 130 is raised far enough to permit the coated stator's being unloaded, and the treating cycle is completed. The stator coating may be given a further curing or other treatment, but that is outside the scope of the invention.

Stators are commonly clamped or welded along their outside surfaces, to hold the laminations together. It is a characteristic of such stators that the teeth tend to fan axially, so that the height of a stack along the bore will be slightly greater than the height along the outside wall. To compensate for this, the masking sleeve 150 is permitted a certain amount of upward movement by the O-ring 153, the allowed movement being more than adequate to compensate for the fanning. At the lower end of the stator, the inner masking ring 85 is supported somewhat flexibly by the plate 86, to permit the masking ring 85 to move downward slightly in response to the fanning of the teeth. The teeth are further protected against undue clamping pressure by the springs 112 and 114, the total amount of clamping pressure being dependent entirely upon the stiffness of those springs. It is important that the teeth not be clamped too tightly, first because it is desirable to obtain some "keying" of the coating between the teeth, and second, because if they spring apart after the coating operation, there is likely to be a crack in the finished coating.

Under the circumstances of hot stator, cold metal masking parts, irregular surfaces, limited clamping pressure and sliding fits of the various relatively moving masking parts, it would appear to be difficult, if not impossible, to obtain adequate masking and at the same time to obtain a uniform coating of the slot walls, without forming heavy deposits of plastic on the masking parts, to the extent that they would be rendered ineffective. It has been discovered however that with the arrangement of parts and with the cooling system shown, using water with an inlet ambient temperature of approximately 70–110° F. and a discharge temperature having approximately a 10° F. temperature rise, which maintains the post and upper and lower outer masking rings at a temperature of about 80–120° F., for excellent masking of the parts to be masked and coating of the parts to be coated is obtained.

With the stator, tank and masking case of the dimensions indicated, the temperature of the stator is 385–390° F., and the bed density of epoxy resin as given, it has been found desirable to immerse the stator for two, one second periods, separated only by enough time to lower the tank and raise it again.

With this treatment, a substantially uniform, uninterrupted coating, about .012–.016 inch thick is provided.

It is to be noted that the vibrators 180 and 181 were not mentioned as being used. If, on a particularly difficulty coatable stator, it is desired to use the vibrators, they may be turned on constantly, or, preferably they may be actuated when the disk 110 engages the bumpers 198. As can be seen from FIGURE 3, as the stator seats in the masking case, the disk 110 cams the bumpers 198, hence the arms 194, outwardly, causing the shoes 195 to clamp against the rods 94, the vibrations from the spring-mounted frame 75 are then transmitted through the case 80 and ears 92, to the rods 94, hence to the shell 120, plate 108, post 130 and stator 200. It can be seen that the vibrators can be mounted to produce vibration in any desired direction.

The electrical control system for the motor 40, air cylinder 102, compressed air to nozzle 160, and vibrators 58, 180 and 181 has not been shown. A system by which the steps of the entire cycle can be made to follow automatically when initiated can be provided by anyone skilled in the programming art, and does not form a part of this invention.

FIGURES 8–12 illustrate a second embodiment of coating apparatus of this invention. The arrangement of tank, frame and tank operating components can be the same as that of the first embodiment.

One of the features of the second embodiment different from the first embodiment is the arrangement for relative movement, in the second embodiment, of parts of the masking ring. In this embodiment, a masking case shell 800 is fixedly mounted on a frame, much as the masking case (shell) 80 of the first embodiment. In the present embodiment, however, an inner lower masking ring 805 and an outer lower masking ring 808, both mounted on a lower tool assembly bracket 811, move axially into and out of shell 800.

Figure 11:
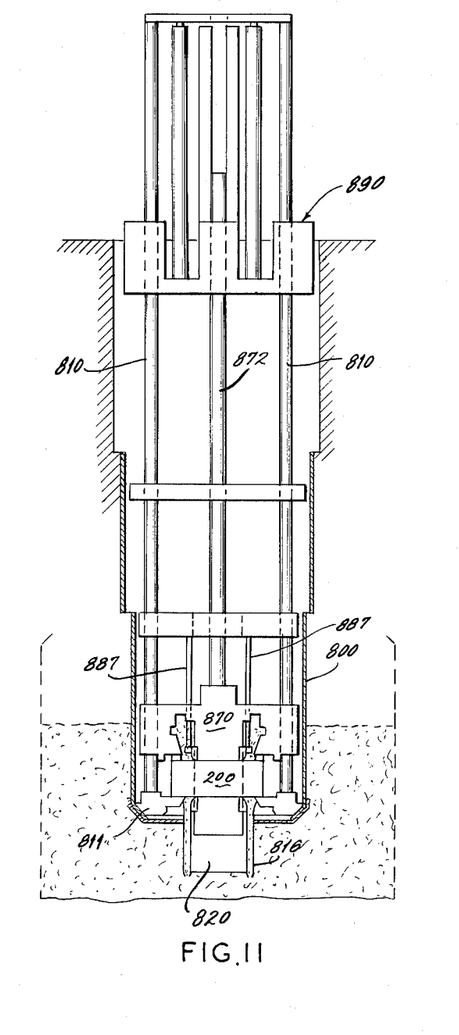
FIGURE 11 illustrates the condition of the apparatus in the fourth, fifth (in dotted lines) and sixth steps.

The lower tool assembly bracket 811 is annular, and is mounted on the lower ends of masking rods 810. The bracket 811 has a chamfer 812 around its lower outer edge which seats on a sloped shoulder 813 in the shell 800 when the assembly is in stator coating position, as shown in FIGURE 11.

A pipe 816 is supported directly by the bracket 811 as is the outer lower masking ring 808. The bracket 811 and the outer lower masking ring 808 are water cooled, passages 814 and fittings and piping 815 being supplied for that purpose.

The inside wall of the masking ring 808 forms a smooth continuation of the inside wall of the pipe 816, which projects downwardly beyond the bracket 811 a substantial distance.

Concentric with and within the pipe 816, and mounted on the inner lower masking ring 805, is a cannister 820, the outer wall of which forms a smooth continuation of the outer wall of the inner lower masking ring 805. The cannister 820 is hollow and is closed at its lower end by an airtight bottom wall 821.

The outer wall of the cannister and the inner wall of the pipe 816 define between them a powder passage 822.

Thin webs 823, extending between the outer lower masking ring 808 and inner lower masking ring 805, serve to support the inner lower masking ring 808 and cannister 820.

The upper surface of the outer lower masking ring 808 is continuous. The inner lower masking ring 805 is provided with teeth 806 corresponding in position and in circumferential extent with the bottom radially inner margin of the teeth of the stator 200. This leaves between each of the teeth 806 a gap corresponding in size with the gap between successive stator teeth, and with the same orientation. The teeth 806, are, however, of a radial depth only slightly greater than the radial projection of splines 850 from a masking post 855.

The masking post 855 in this embodiment is hollow, with a central passage 856, but the central passage 856 is connected at its upper end to a gas passage 858, in turn connected to a source of compressed gas, usually compressed air, not here shown. The masking post illustrated is water cooled, with a water cavity 859 and suitable passages and fittings 861.

The masking post 855 is carried by an upper tool assembly bracket 870 which is mounted to slide on and be guided by the mask rods 810. The upper bracket 870 is carried by and moved vertically by a piston rod 872. The piston rod 872 is operated by a master cylinder 890 fixedly mounted on a stanchion which is part of the fixed frame structure.

The master cylinder 890 also operates, independently of the piston rod 872, the mask rods 810.

The upper bracket 870 carries an outer upper masking ring 880, which, like the outer lower masking ring 808, is cooled by the circulation of water. Suitable passages and fittings 881 are provided for that purpose. Also like the outer lower masking ring 808, the surface of the outer upper masking ring 880 which comes in contact with the stator is continuous.

An inner upper masking ring, is, in this embodiment, called a stripper 885. The stripper 885 is slidably mounted around the post 855 for axial movement relative to the post and is connected to and controlled by stripper rods 887. In the embodiment shown, the stripper rods 887 perform a double function of compressed gas conduits and stripper operators. The stripper rods 887 are carried at their upper ends by a heavy stripper bracket 888, slidably mounted on the mask rods 810 and piston rod 872.

The stripper 885 has teeth 886, positioned and proportioned to fit the top radially inner margin of the stator teeth, thus defining spline-receiving gaps between them, in which the splines 850 are positioned.

The annular space between the stripper 885 and the outer upper masking ring 880 is connected to compressed gas and vacuum sources, not here shown, so that powder can be sucked up, forced down, or blown around, selectively.

Figure 8:
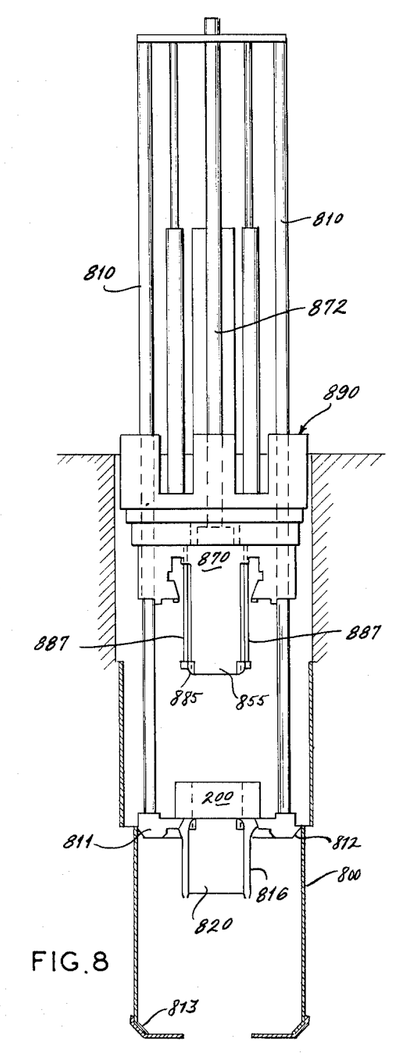

In the operation of the second embodiment of apparatus of this invention, the initial position of the various parts is shown in FIGURE 8. There, a heated stator core has been placed on the lower masking rings, indexed by some conventional means such as a notch, so that the teeth 806 bear upon and are aligned with the bottom margins of the stator teeth. Both the upper and lower tooling brackets are in their uppermost position.

Figure 9:
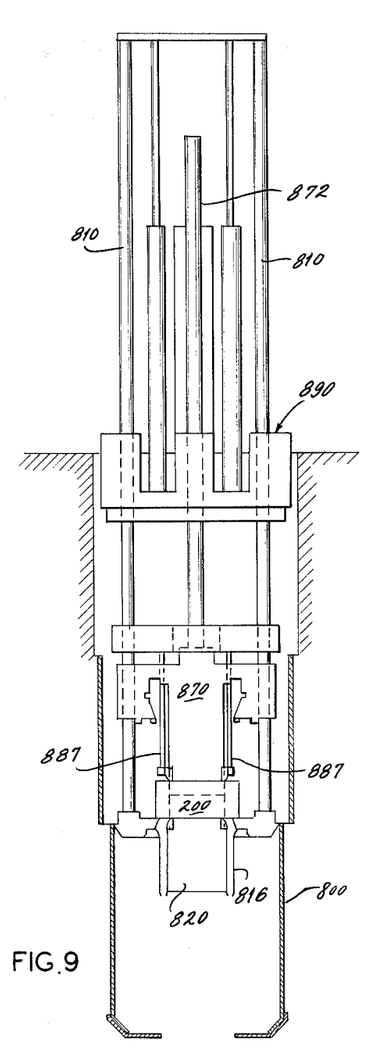
FIGURE 9 illustrates the condition of the apparatus in the second and eighth steps.
Figure 10:
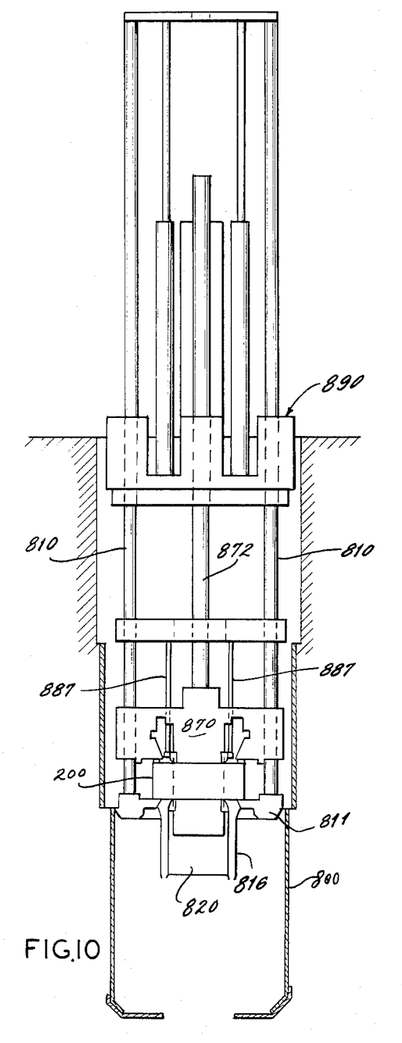
FIGURE 10 illustrates the condition of the apparatus in the third and seventh steps.
Figure 12:
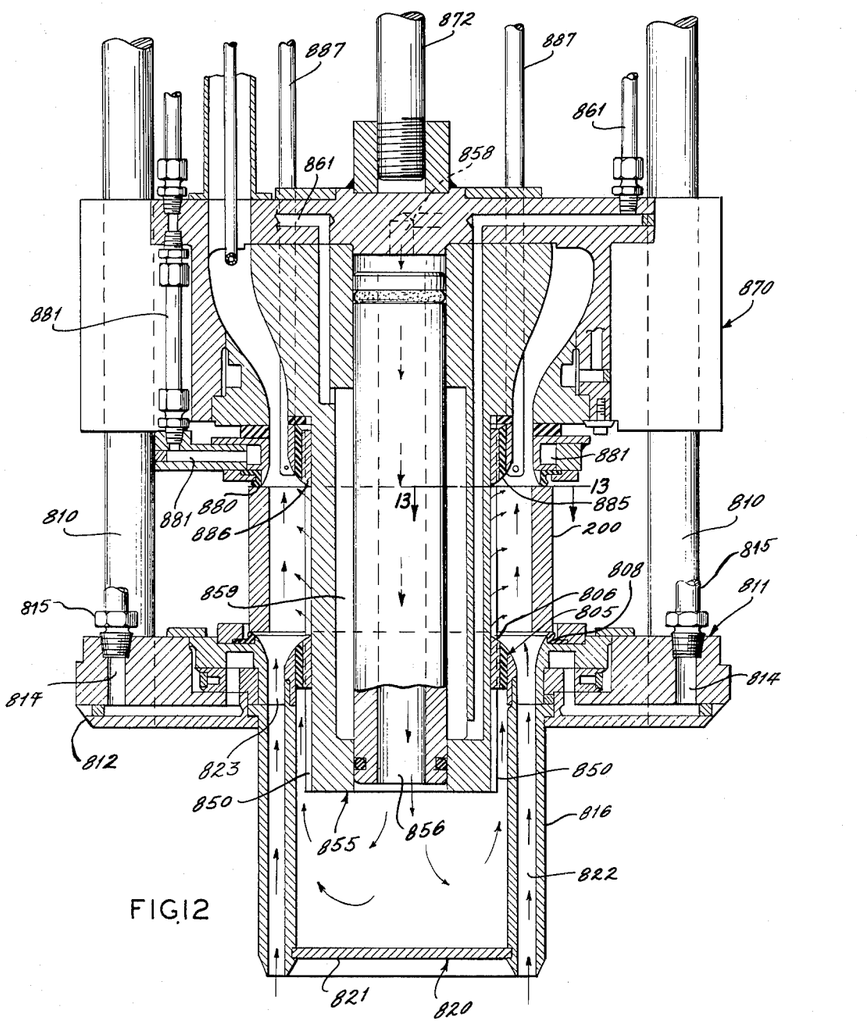
FIGURE 12 is a longitudinal sectional view of the embodiment of apparatus shown schematically in FIGURES 8–11.
Figure 13:
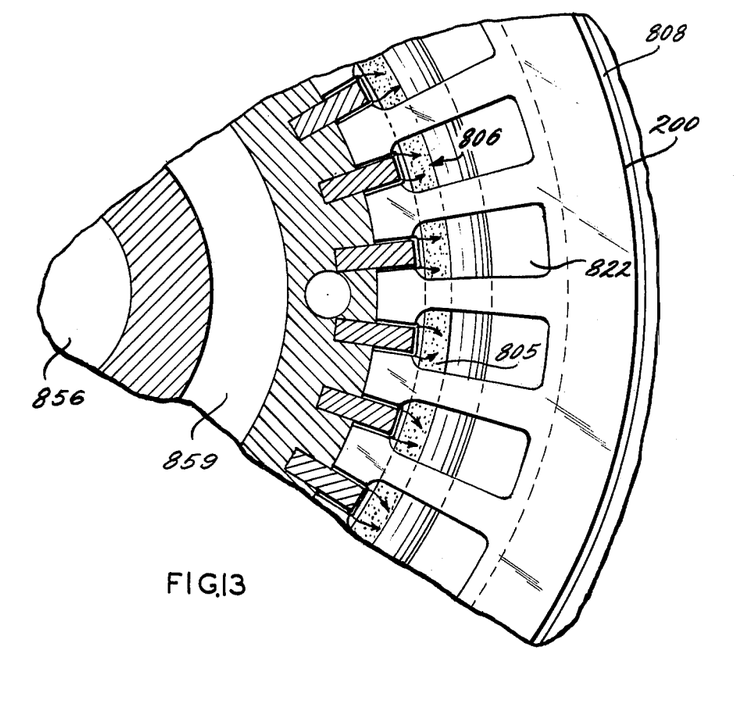
FIGURE 13 is a fragmentary sectional view taken along the line 13—13 of FIGURE 2.

While the lower tooling bracket is held in its uppermost position, the upper tooling bracket is moved down, by the central cylinder of the master cylinder 890, and the piston rod 872, until the stripper 885 meets and is stopped by the upper marginal surface of the stator teeth. The upper tool assembly bracket 870 then continues downwardly, pushing the masking post through the stator core, with its splines extending into the gaps between the stator teeth, as indicated in FIGURES 9 and 12, until the outer upper masking ring 80 impinges upon the upper surface of the stator core radially beyond the slots, as shown in FIGURES 10 and 12.

Now, with the stator clamped between the upper and lower masking rings, the outer cylinders of the master cylinder 890 are also actuated to move the entire assembly down into the shell 800 until the lower tool assembly bracket chamfer 812 seats on the sloping shoulder 813, as shown in FIGURE 11. As shown in that figure, the cannister 820 and pipe 816 project substantially below the lower margin of the shell 800.

A flow of gas under pressure, normally compressed air, is now started through the passages 858 and 856, into the cannister 820. The air then is distributed circumferentially, passes up in a passage between the inner wall of the cannister and the outer wall of the masking post, and, in small but appreciable amounts along the side walls of the splines 850 and through any hairline gap between the teeth 806 of the inner lower masking ring and the teeth of the stator, to form a kinetic mask along those surfaces.

The tank containing the fluidized bed is then raised, as shown in dotted lines in FIGURE 11. The powder moves up through the powder passage 822, through the stator slots and into the passage between the stripper 885 and the outer upper masking ring 880. When sufficient of the powder has stuck to the walls defining the stator slots, the tank is lowered and the excess powder is blown down. The steps are then repeated in reverse order. The entire assembly is raised to the position shown in FIGURE 10. The stripper 885 remains in contact with the stator as the making post is withdrawn. When the end of the masking post has reached the top of the stator, then continued upward movement of the upper tooling bracket lifts both the masking post and the stripper until it is restored to the position shown in FIGURE 8. The treated stator core can now be removed.

The most desirable amount of air flow through the masking post, cannister and splines will be determined by the thickness of the stator, the coating material used, the fit of the splines and lower inner masking ring. This is also true of the pressure. Satisfactory results have been obtained with a stator core approximately four inches thick (axially) with a head of approximately six inches of water. The pressure should be enough barely to overbalance the head of the fluidized bed. In this respect, the pressure gradient in the bed is an advantageous factor, since the back pressure at the lower end of the stator will be slightly greater than that at its upper end, and the flow is therefore likely to be more nearly uniform than if there were uniform back pressure from bottom to top.

Numerous variations in the construction of the apparatus of this invention within the scope of the claims will occur to those skilled in the art in the light of the foregoing disclosure. For example, a low vacuum can be applied beneath the cover 82, to remove dust above the dense body of the fluidized bed; a low vacuum can be applied in the shell 120 to raise the level of the fluidized bed within the chamber between the top of the stator and the plate 108, thus ensuring an adequate supply of powder to the slots. The means for raising and lowering the tank and the masking post may be varied, as may the means for limiting the clamping pressure applied to the stator and for accommodating the fans of the stator teeth. Other plastics, such as cellulosic esters, polyethylene, vinyl resins, nylon, and chlorinated polyethers (cf. S.A.E. preprint 180D, "Fusion Bond Coatings—A New Technique for Plastic Cladding Metal" by W. R. Pascoe) may be used, in which event different temperatures and treating times may be required. These are simply illustrative of such variations.

Thus it can be seen that apparatus is provided by which the walls of long, narrow stator slots can effectively be coated.

Having thus described the invention, what is claimed and desired to be secured by Letters Patent is:

1. Apparatus for coating the slot-defining walls of a stator with a sinterable plastic, comprising a tank, containing a fluidized bed of said plastic in powder form; a hollow post extending substantially perpendicularly to the surface of the fluidized bed, said post and said tank being supported for movement relative to one another in a direction axially of the post between a position at which the post is clear of said fluidized bed and a position at which it projects within said fluidized bed, said post being of an external configuration snugly but slidably to fit the bore of a stator to be coated and a length to project entirely through said bore, being open at its lower end and being provided at its upper end with means for maintaining the pressure within the said post at least substantially as low as the pressure in said fluidized bed at the same level in said tank; a masking case positioned around but supported for relative movement with respect to the post and spaced radially therefrom a distance sufficient to accommodate a stator within the bore of which the post projects, said masking case having at least one opening in its bottom to admit said powdered plastic to the interior of said post, and means within said masking case, adapted to engage a lower part of a stator on said post, to define, with at least a part of the outside surface of said stator and the inner wall of said masking case, a chamber substantially isolated from direct access of the said powdered plastic in said tank.

2. The apparatus of claim 1 wherein the interior of the post communicates with the atmosphere and the ratio of area of the free opening in the post to the area of the slots of a stator to be treated is at least one to two.

3. The apparatus of claim 1 wherein the post is provided with splines extending axially of said post and adapted to fit snugly but slidably within gaps between adjacent teeth defining slots in the stator to be treated.

4. The apparatus of claim 1 wherein the post is provided with a coolant jacket by which the temperature of the post is maintained below the sintering temperature of the plastic coating material.

5. The apparatus of claim 1 wherein the post is slidably embraced by a masking sleeve the lower edge of which is adapted to engage the upper radially extending surface, immediately contiguous the said post, of a stator through the bore of which the post extends and biasing means are provided, bearing on said sleeve, whereby said sleeve is resiliently biased toward stator engaging position and capable of movement against said bias through the distance of the fanning displacement of the stator teeth.

6. The apparatus of claim 5 wherein the post is provided with axially extending splines and the masking sleeve is provided with axially extending grooves complementary to said splines.

7. The apparatus of claim 5 wherein the means by which the sleeve is resiliently biased is an O-ring compressed between a radially extending surface of said sleeve and a radially extending surface fixed with respect to said post.

8. The apparatus of claim 1 wherein the post is carried by a supporting plate, said supporting plate carrying a masking ring fixed against movement relative to said post and said post carrying a masking sleeve slidably mounted around said post for limited relative movement with respect to said post and said masking ring, said masking sleeve being resiliently biased toward the free end of said post.

9. In apparatus for coating the slot-defining walls of a stator with a sinterable plastic, including a base frame, tank elevating means carried by said base frame, a tank within said base frame and arranged to be raised and lowered by said tank elevating means and a stanchion supported by the base frame and extending above said base frame, the improvement comprising a masking case, supported by and positioned intermediate members of said base frame above said tank; at least one vertical runner rigidly connected to said masking case and resiliently connected to said stanchion; power means mounted on said stanchion and connected to reciprocate a piston rod extending parallel with and adjacent said runner; a post connected to be moved by said piston rod between a position within said masking case and a position clear of said masking case, said post being adapted to carry a stator to be coated, vibrating means operatively connected to said masking case, hence to said vertical runner, and means mounted to connect said post with said vertical runner when said post is in its position within the masking case and to disconnect said post from said runner when said post is in its position clear of said masking case.

10. Apparatus for coating the slot-defining walls of a stator with a sinterable plastic, comprising a tank containing a fluidized bed of said plastic, a hollow post mounted for relative movement with respect to said tank from a position clear of said fluidized bed to a position at which it projects into said fluidized bed, said post being of an external configuration snugly but slidably to fit the bore of a stator to be coated, being open at the end projecting into the fluidized bed and provided at its other end with means for maintaining the pressure within the post at least substantially as low as the pressure in said fluidized bed at the same level in said tank, and masking means comprising inner and outer masking rings at the projecting end of the post, said post slidably extending, in its projecting position, into said inner masking ring, and a post-embracing masking sleeve at the other end of said post, said inner masking ring being flexibly mounted, relative to the outer masking ring to permit relative movement, axially of the post, with respect to the outer masking ring, and said masking sleeve being slidably mounted on said post and resiliently biased toward the projecting end of said post for limited relative movement with respect to said post.

11. Apparatus for coating the slot-defining walls of a stator, comprising a frame, a masking case rigidly mounted in said frame, said masking case having an outer masking ring fixedly mounted within said masking case, an open-topped tank positioned below said masking case for relative vertical movement with respect thereto, in at least one relative position of which at least a part of the masking case is within said tank, a stator supporting post mounted for movement relative to said masking case from a position clear of said masking case to a position at which a free end of said post extends within said masking case, an upper masking ring fixedly mounted with respect to said post, said upper masking ring and said outer masking ring serving to clamp between them a stator mounted on said post when said post is in the position in which it projects within said masking case, power means connected to move said post and upper masking ring relative to said masking case, and resilient means operatively connecting said power means with said post and upper masking ring to limit the clamping pressure between said upper and said outer masking rings.

12. Apparatus for coating the slot-defining walls of a stator with a sinterable plastic, comprising a tank containing a fluidized bed of said plastic in powder form, a hollow post extending substantially perpendicularly to the surface of the fluidized bed, said post and said tank being supported for movement relative to one another in a direction axially of the post between a position at which the post is clear of said fluidized bed and a position at which it projects within said fluidized bed, said post being of an external configuration snugly but slidably to fit the bore of a stator to be coated and a length to project entirely through said bore, being open at its lower end and being provided at its upper end with means for maintaining the pressure within the said post at least substantially as low as the pressure in said fluidized bed at the same level in said tank, and a masking case, aligned axially with said post and positioned between said post and said tank, said masking case having inner and outer masking rings adapted to engage the radially extending lower surface of a stator mounted on the post, and an imperforate web extending radially between the outer masking ring and the case, said case, imperforate web and outer masking ring defining, with a stator engaged by said outer masking ring, a chamber, sealed against ingress of plastic powder from said fluidized bed.

13. The apparatus of claim 12 wherein the post is provided with splines extending axially of the post and adapted to fit snugly but slidably within gaps between adjacent teeth defining slots in the stator to be treated, and the inner masking ring is provided on its inside wall with axially extending grooves complementary to the splines on the post.

14. The apparatus of claim 12 wherein the inner masking ring is supported by means having sufficient resiliency to permit axial movement of the inner ring through the distance of the fanning displacement of the stator teeth.

15. The apparatus of claim 12 wherein the area of the fluidized bed within a circle of which the axis of the post is the center is at least 3 times the transverse cross-sectional area of the masking case.

16. Apparatus for coating the axially extending walls of teeth defining radially inwardly opening slots of a stator with a sinterable plastic, comprising a masking case having a lower masking tool assembly including an outer masking ring; an open topped tank containing a fluidized bed of said plastic in powder form, said tank being positioned below said masking case for relative vertical movement with respect thereto, at least one relative position of which at least a part of the masking case is within the fluidized bed; a stator supporting post mounted for movement relative to said masking case from a position clear of said masking case to a position at which a free end of said post extends within said masking case; splines on said post, adapted to extend slidably within the gaps between teeth of said stator, an upper masking ring fixedly mounted with respect to said post, said upper masking ring and said outer masking ring serving to clamp between them a stator mounted on said post when said post is in the position in which it projects within said masking case, and power means connected to move said post and upper masking ring relative to said masking case.

17. The apparatus of claim 16 wherein the masking case includes an inner, open-topped, post-receiving cannister and means are provided for introducing gas under pressure to said cannister when said post is received therein.

18. The apparatus of claim 17 wherein a spline-receiving ring is provided at the upper margin of said cannister, the said post defines, with the bore defining wall of the stator, a gas admitting passage and the splines on said post define, with the walls defining the slot gaps, gas admitting passages.

19. The apparatus of claim 17 wherein the masking case includes an open-ended shell, the lower end of which is below the outer masking ring, the outer masking ring and the said lower end of the open-ended shell having complementary seating means and said outer masking ring and the cannister being vertically movable with respect to said open-ended shell.

20. The apparatus of claim 16 wherein a stripper is provided slidably embracing said post and splines and mounted to engage the upper end of a stator mounted on the masking case when the post extends therethrough and for relative axial movement with respect to said post, and means are provided for clamping said stripper when said post is in its lowered position.

21. A method of coating with sinterable material a part of the walls of teeth defining a multiplicity of winding-receiving slots of a stator core, said teeth being spaced to define for each slot a winding-receiving area to be coated, and, radially inwardly thereof a relatively narrow gap opening into the bore of the core, said method comprising heating said core to at least the sintering temperature of the coating material; inserting in each of said gaps a spline through the full radial reach of said gap, said spline having side walls spaced from the gap-defining walls of the teeth sufficiently to admit gas therebetween; forcing gas under pressure along and past the side walls of said spline, thereby forming a kinetic mask along the gap-defining walls of contiguous teeth; introducing said sinterable coating material in the form of particles in a gas medium into the winding-receiving area of said slot of the hot core while maintaining the said kinetic mask; thereafter stopping the introduction of particulate coating material to the winding-receiving area of said slot, removing excess coating material from said slot, and stopping the flow of said masking gas.

22. A method of coating with a sinterable material a part of the walls of teeth defining a multiplicity of winding-receiving slots of a stator core, said teeth being spaced to define for each slot a winding-receiving area to be coated and, radially inwardly thereof, a relatively narrow gap opening into the bore of the core, said method comprising inserting in each of said gaps a spline through the full radial reach of said gap, said spline having side walls spaced from the gap-defining walls of the teeth sufficiently to admit gas therebetween; forcing gas under pressure along and past the said side walls of said spline, thereby forming a kinetic mask along the gap-defining walls of contiguous teeth; introducing said sinterable coating material in the form of particles in a gas medium into the winding-receiving area of said slot while maintaining the said kinetic mask; thereafter stopping the introduction of particulate coating material to the winding-receiving area of said slot, depositing said coating material on the unmasked area of said winding-receiving area of the slot of said hot core, and thereafter stopping the flow of masking gas.

23. A method of coating with a sinterable material a predetermined part of the walls of teeth defining a multiplicity of winding-receiving slots of a stator core, said teeth being spaced to define for each slot a winding-receiving area to be coated and, radially inwardly thereof, a relatively narrow gap opening into the bore of the core, said method comprising heating said core to at least the sintering temperature of said material; inserting in each of said gaps a spline through the full radial reach of said gap; introducing said coating material in the form of particles in a gas medium into the winding-receiving area of said slot; forcing gas along the edges of said spline through the radial reach of said gap, maintaining in the gap area along the said spline a gas pressure sufficient to inhibit entrance of particulate coating material between the spline and the gap-defining walls of the teeth; thereafter discontinuing the introduction of said particulate coating material into the winding-receiving area of said slots and removing said spline by moving said spline and said core axially relative to one another while exerting axial pressure against the teeth of the core on the axial end of the core from which the said spline last leaves said core.

References Cited by the Examiner
UNITED STATES PATENTS

| 2,182,364 | 12/1939 | Smith | 118—425 X |
| 2,675,780 | 4/1954 | McLaughlin et al. | 118—406 |
| 2,844,489 | 7/1958 | Gemmer | 117—21 X |
| 2,867,551 | 1/1959 | Kozak | 118—301 X |
| 2,946,697 | 7/1960 | Petro | 118—301 X |
| 3,034,479 | 5/1962 | Larsh et al. | 118—406 |
| 3,093,510 | 6/1963 | Olson et al. | 117—230 |
| 3,142,579 | 7/1964 | Brooks | 118—406 X |

RICHARD D. NEVIUS, *Primary Examiner.*

J. P. McINTOSH, *Assistant Examiner.*